United States Patent [19]

Sood

[11] Patent Number: 4,752,397

[45] Date of Patent: Jun. 21, 1988

[54] PROCESS FOR REMOVING HEAVY METAL IONS FROM SOLUTIONS USING ADSORBENTS CONTAINING ACTIVATED HYDROTALCITE

[75] Inventor: Ajay Sood, Pittsburgh, Pa.

[73] Assignee: Aluminum Company of America, Pittsburgh, Pa.

[21] Appl. No.: 880,297

[22] Filed: Jun. 30, 1986

[51] Int. Cl.$^4$ ................................................ C02F 1/28
[52] U.S. Cl. ................................. 210/662; 210/670; 210/684; 210/686; 210/688
[58] Field of Search ............... 210/662, 670, 688, 684, 210/686; 502/415; 75/117-121; 423/25, 53, 54, 87, 89, 99, 100, 111, 112, 138, 139, 508-510

[56] References Cited

U.S. PATENT DOCUMENTS

| | | | |
|---|---|---|---|
| 2,653,089 | 9/1953 | Brooke | 210/688 |
| 3,650,704 | 3/1972 | Kumura et al. | 23/315 |
| 4,033,764 | 7/1977 | Colegate et al. | 210/688 |
| 4,264,373 | 4/1981 | Shinbori et al. | 210/670 |
| 4,458,026 | 7/1984 | Reichle | 502/80 |
| 4,458,030 | 7/1984 | Manabe et al. | 502/183 |
| 4,642,193 | 2/1987 | Miyata et al. | 210/683 |
| 4,656,156 | 4/1987 | Misra | 502/415 |

FOREIGN PATENT DOCUMENTS 79024993 11/1973 Japan .
61-133190 6/1986 Japan .

OTHER PUBLICATIONS

George C. Cushnie, Jr., *Electroplating Wastewater Pollution Control Technology*, Park Ridge, N.J.: Noyes Publications, pp. 1-9, 30-37, and 48-54.

Jay A. Mackie et al., "The Alternatives", *Chemical Engineering*, Aug. 6, 1984, pp. 51-64.

W. Wesley Eckenfelder, Jr. et al., "Waste Water Treatment", *Chemical Engineering*, Sep. 2, 1985, pp. 60-74.

G. J. Ross et al. "Properties of a Synthetic Magnesium-Aluminum Carbonate Hydroxide and Its Relationship to Magnesium-Aluminum Double Hydroxide, Manasseite and Hydrotalcite", *The American Mineralogist*, Vol. 52, (Jul.-Aug., 1967), pp. 1036-1047.

Sato, Tsuglo, et al., "Adsorption of Various Anions by Magnesium Aluminum Oxide ($Mg_{0.7}Al_{0.3}O_{1.15}$)", *Industrial & Engineering Chemistry Product Research and Development*, vol. 25, No. 1, Mar. 1986, pp. 89–92.

*Primary Examiner*—Ivars Cintins
*Attorney, Agent, or Firm*—Andrew Alexander; John P. Taylor

[57] ABSTRACT

An improved process is disclosed for the purification of an impure aqueous solution containing heavy metal ions which comprises passing the impure solution through a bed of activated adsorbent containing at least 20 wt. % activated hydrotalcite formed by reacting activated magnesia with an aqueous solution containing ions of aluminate, carbonate, and hydroxyl. The heavy metal ions are removed from the impure aqueous solution by adsorption onto the activated hydrotalcite-containing adsorbent. The adsorbent may be regenerated for reuse and the adsorbed metals recovered by subsequently stripping the metal ions from the adsorbent and recycling the metal ions back to the process of origin. The pH of the effluent may be monitored to determine when the capacity of the adsorbent has been reached and regeneration of the adsorbent should be commenced.

22 Claims, 10 Drawing Sheets

PROCESS FOR REMOVING HEAVY METAL IONS FROM SOLUTIONS USING ADSORBENTS CONTAINING ACTIVATED HYDROTALCITE

BACKGROUND OF THE INVENTION

1. Field of the Invention

This application relates to a process for purification of a solution. More particularly, this application relates to a process for removing heavy metal contaminants from a solution using activated hydrotalcite or a mixture of activated hydrotalcite and activated alumina as an adsorbent.

2. Description of the Related Art

Historically, very little attention was addressed to the disposal of industrial waste, due in part to lack of governmental regulation, and, more importantly, probably due to an overall lack of knowledge or appreciation by industry of the long term effects of industrial waste on the environment. Now, however, due both to government regulations and corporate responsibility, much attention has been addressed to proper handling and disposal of waste materials classified as hazardous or toxic.

Such materials include organics, heavy metals, cyanides, etc. Treatments for such materials include physical, chemical, biological, thermal, etc., depending upon the type of pollutant. Treatment of solutions containing heavy metals usually fall into the categories of physical and chemical. Most popular are the chemical treatments which treat the heavy metals to form compounds which will precipitate such as, for example, treatment with alkalies such as caustic soda or lime to form hydroxide precipitates or treatments with sulfur-containing compounds to form sulfides or sulfates.

Such methods for treating heavy metal pollutants are discussed in "Electroplating Wastewater Pollution Control Technology", by George C. Cushnie, Jr. published by Noyes Publications, Park Ridge, N.J. in 1985, at pp 1-9, 30-37, and 48-54: in an article published in Chemical Engineering in August of 1984 at pp 51-64 entitled "Hazardous Waste Management: The Alternatives", by Mackie et al; and in an article published in Chemical Engineering in September, 1985 at pp 60-74 entitled "Wastewater Treatment", by Eckenfelder, Jr. et al.

While such treatments work well for their intended purpose, i.e., to remove heavy metals from a plating solution or the like, they, in turn, create new problems. Conversion of heavy metal compounds to precipitates by neutralization, for example, as described in the aforementioned articles, forms hazardous sludge which must, in turn, be disposed of in an environmentally acceptable manner.

Other treatments have also been discussed for the removal of heavy metals from solutions such as electroplating solutions. Such methods, which are mentioned in the aforesaid Mackie et al article on page 57, and the Eckenfelder Jr. et al article on page 71, include: ion exchange, using caustic soda instead of lime to increase resin selectivity; activated-carbon adsorption; and reverse osmosis and evaporation.

Manabe et al U.S. Pat. No. 4,458,030 discloses an adsorbent composition comprising 5 to 95 wt. % hydrotalcite and 5 to 95 wt. % activated carbon. The patentees point out that each of the materials have deficiencies as adsorption agents which are apparently overcome by a synergistic effect of using the materials in combination. The patentees state that the hydrotalcite useful in their adsorbent composition may be produced by reacting an aqueous solution of a water-soluble Mg compound and/or a water-soluble Zn compound, such as magnesium chloride, magnesium sulfate, zinc chloride, and zinc sulfate with an aqueous solution of a water-soluble Al compound such as aluminum chloride, aluminum sulfate and sodium aluminate together with an aqueous solution of an alkali such as sodium hydroxide, potassium hydroxide, ammonia, sodium carbonate, and sodium oxalate.

Hydrotalcite is a naturally occurring mineral having either the formula $6MgO.Al_2O_3.CO_2.12H_2O$ or $Mg_{6p}Al_2(OH)_{16}CO_3.4H_2O$. Known deposits of natural hydrotalcite are very limited and is not present as pure product. Rather it contains other minerals such as pennite and muscovite as well as potentially undesirable minerals such as heavy metals. Conventional practice recognizes that it is practically impossible to remove such impurities from a natural hydrotalcite.

Previous attempts to produce a synthetic hydrotalcite of higher purity have included adding dry ice or ammonium carbonate (a) to a mixture of magnesium oxide and alpha-alumina or (b) to a thermal decomposition product from a mixture of magnesium nitrate and aluminum nitrate and thereafter maintaining the system at temperatures below 325° C. at elevated pressures of 2,000-20,000 psi. However, such processes are not practical for industrial scale production of synthetic hydrotalcite because of the high pressures employed. Furthermore, the use of such high pressures can form substances other than hydrotalcite such as brucite, boehmite, diaspore, and hydromagnesite.

Other processes for producing synthetic hydrotalcite are known. Ross and Kodama, in an article entitled "Properties of A Synthetic Magnesium-Aluminum Carbonate Hydroxide and Its Relationship to Magnesium-Aluminum Double Hydroxide Manasseite, and Hydrotalcite", published in 1967 in *The American Mineralogist*, at volume 52, pp 1036-1047, describe a process for producing a hydrotalcite-like material by titrating a mixed solution of $MgCl_2$ and $AlCl_3$ with NaOH in a $CO_2$ free system and then dialyzing the suspension for 30 days at 60° C. to form a hydrated Mg-Al carbonate hydroxide. The mineral product is associated with the formula $Mg_6Al_2CO_3(OH)_{16}.4H_2O$ and has the properties of manasseite and hydrotalcite.

Reichle U.S. Pat. No. 4,458,026 discloses novel catalyst materials produced as a preparation of Mg/Al carbonate hydrotalcite which involves the addition of mixed magnesium/ aluminum nitrates, sulfates, or chlorides as an aqueous solution to a solution of a stoichiometric amount of sodium hydroxide and carbonate at about 25-35° C. while stirring over a period of several hours to produce a slurry. The slurry is then heated for about 18 hours at about 50°-200° C. (preferably 60°-75° C.) to allow a limited amount of crystallization to take place. After filtering the solids, washing, and drying, the dry solids are recovered.

Kamura et al U.S. Pat. No. 3,650,704 also describes the preparation of synthetic hydrotalcite by adding an aqueous solution of aluminum sulfate and sodium carbonate to a suspension of magnesium hydroxide. The suspension is then washed with water until the presence of sulfate radical is no longer observed. The suspension is then heated at 85° C. for three hours and dried. The magnesium component of the starting material is reported as any member of the group consisting of magnesium oxide, magnesium hydroxide, magnesium carbonate, and water-soluble magnesium salts, e.g., such as mineral acid salts including magnesium chloride, magnesium nitrate, magnesium sulfate, magnesium dicarbonate, and bittern.

In Misra U.S. patent application Ser. No. 788,853, cross-reference to which is hereby made, the production of a unique synthetic hydrotalcite is described and claimed wherein an activated magnesia is reacted with an aqueous solution containing ions of aluminate, carbonate, and hydroxyl to form hydrotalcite in high yield and of high purity. The purpose of using activated magnesia was to insure formation, by the reactants, of hydrotalcite rather than other materials which would lower both the yield and the purity of the synthetic hydrotalcite.

SUMMARY OF THE INVENTION

It has now been discovered, however, that this hydrotalcite material, in an activated form, referred to hereinafter as activated hydrotalcite, possesses superior properties as an adsorbent for heavy metals present, for example, as contaminants in aqueous solutions. The metals may be recovered and the adsorbent regenerated for future use.

It is therefore, an object of this invention to provide an improved process for the removal of heavy metal ions from an aqueous solution.

It is another object of this invention to provide an improved process for the removal of heavy metal ions from an aqueous solution using an adsorbent which contains activated hydrotalcite.

It is yet another object of this invention to provide an improved process for the removal of heavy metal ions from an aqueous solution using an adsorbent which contains activated hydrotalcite resulting in higher adsorption capacities and flow rates.

It is a further object of this invention to provide an improved process for the removal of heavy metal ions from an aqueous solution using an adsorbent containing activated hydrotalcite wherein the adsorbent may be regenerated by the removal of the adsorbed metals from the activated hydrotalcite adsorbent.

It is yet a further object of this invention to provide an improved process for the removal of heavy metal ions from an aqueous solution using an adsorbent containing activated hydrotalcite wherein the adsorbent may be regenerated by the removal of the adsorbed metals from the adsorbent and the recovered concentrated metal stream may be recycled.

These and other objects of the invention will become apparent from the following description and accompanying drawings.

In accordance with the invention, an improved process for the purification of an impure aqueous solution containing heavy metal ions comprises passing the solution through a bed of adsorbent containing activated hydrotalcite and stripping the adsorbent bed to recover the adsorbed metals and to regenerate the adsorbent.

DETAILED DESCRIPTION OF THE INVENTION

Figure 1:
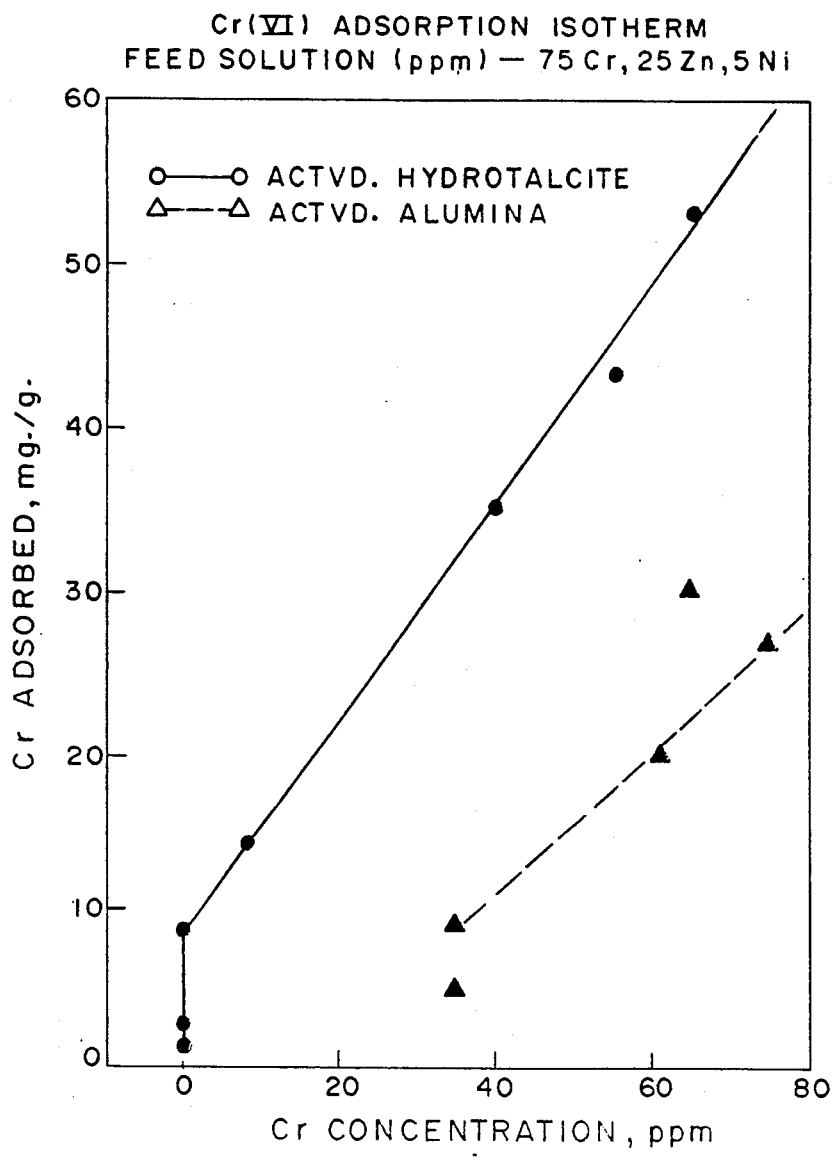
FIG. 1 is a isotherm graphing respectively the adsorption capacity of activated hydrotalcite and activated alumina as adsorbents for chromium ions, viz., $CrO_4^{2-}$.

In accordance with the invention, impure aqueous solutions containing heavy metal ions, for example, heavy metal contaminants such as chromium, zinc, and nickel which are often present in industrial waste waters from operations such as plating process, may be purified by passing the impure solution through a bed of activated hydrotalcite or activated alumina/hydrotalcite adsorbent whereby the metal ions are adsorbed onto the activated adsorbent. The advantage of this process over prior art processes involves the unusual ability of activated adsorbent to adsorb large quantities of such metal ions per unit of adsorbent (expressed herein as milligrams of metal ions adsorbed per gram of adsorbent or mg/g), the simultaneous adsorption of both anions (containing heavy metals such as chromium as $CrO_4^{2-}$) and cations (e.g., $Zn^{2+}$ and $Ni^{2+}$), and the ability to regenerate the adsorbent and recapture of the adsorbed heavy metals. This regeneration aspect of the process permits substantially unlimited maintenance of the adsorption capacity of the adsorbent due to such regeneration.

The process of the invention also permits the subsequent recovery of a concentrated metal stream which may be used to recover and recycle the adsorbed metals, including the possibility of reducing the recovered metals to elemental metal by electrolysis or the like, which results in reduced operating costs due to such recovery and reuse of metal values. In addition, the practice of the process of the invention results in a reduction in stream volumes, and reduced emissions resulting in less pollution, and virtual elimination of waste disposal costs as well as chemical costs usually incurred in such waste disposal such as costs for acids and alkalis to react with the heavy metals to form precipitates.

Certain heavy metal ions are listed by the United States Environmental Protection Agency (EPA) as priority toxic pollutants. The heavy metal ions currently listed under EPA's priority pollutants list include the following metals and their compounds: antimony, arsenic, beryllium, cadmium, chromium, copper, lead, mercury, nickel, selenium, silver, thallium, tin and zinc. A discussion of the toxicity, health impacts, and EPA's allowable limits for these heavy metals can be found on page 2 in "Priority Toxic Pollutants: Health Impacts and Allowable Limits", edited by Marshall Sittig, published by Noyes Publications, Park Ridge, N.J. in 1980.

Therefore, the term "heavy metal ions", as used herein, is intended to include any one or more of the above listed metals or their compounds, either singly or in any combination. Thus, the description of the invention using chromium, zinc, and nickel containing solutions is intended to be exemplary of the process without the intent to limit the invention to these three metals. It must be noted that the invention should work equally well with all the other heavy metals listed above.

It should be further noted that the process of the invention involves the simultaneous adsorption of anions such as $CrO_4^{2-}$ and cations such as $Ni^{2+}$ and $Zn^{2+}$ unlike prior art processes.

Moreover, the process of the invention eliminates the need for reducing hexavalent chromium to trivalent chromium with chemical reducing agents since the hexavalent chromium can be adsorbed on and desorbed from the activated adsorbent directly. Current commercial practices require use of chemical reducing agents such as sulfur dioxide, sodium bisulfite, of sodium metabisulfite to reduce the chromium from the hexavalent to trivalent form after which the chromium is precipitated from the wastewater as chromium hydroxide by increasing the pH above 8.

Formation of the activated hydrotalcite useful in the process of the invention is described, as earlier stated, in Misra U.S. patent application Ser. No. 788,853. In brief, activated magnesia is reacted with an aqueous solution containing ions of aluminate, carbonate, and hydroxyl to form a synthetic hydrotalcite in high yield and of high purity. This hydrotalcite material may then be activated by heating to a temperature of about 500° C. for about 2 hours.

While naturally occurring hydrotalcite has either the formula $6MgO.Al_2O_3.CO_2.12H_2O$ or $Mg_6Al_2(OH)_{16}CO_3.4H_2O$, it will be understood that various hydrotalcite-like materials having varying ratios of magnesium to aluminum are useful in the process of the invention and should be deemed to be included in the use of the term "hydrotalcite" herein.

It is within the scope of the process of the invention that activated hydrotalcite be used by itself or in combination with activated alumina. While activated hydrotalcite has a higher adsorption than activated alumina, it has been found that the adsorbent functions better in a packed bed in granular form ranging in particle size from about ¼ inch down to about −325 mesh (Tyler). The particular shape of the particle is not important. For ease of production, the material is usually formed by extrusion followed by crushing and sizing.

This, in turn, has led to the use of blends of about 20-80 wt. % activated hydrotalcite with the balance comprising activated alumina since blends of the two adsorbents more easily form particulated material. The use of such activated hydrotalcite/alumina blends, therefore, comprises the preferred embodiment of the invention although the use, in the process, of amounts of activated hydrotalcite up to 100 wt. % should be deemed to be within the scope of the invention. The activated hydrotalcite/alumina mixture is preferably blended, in turn, with a small amount of binder (about 0.2-5 wt. %). Such adsorbent mixtures are generally described and claimed in Misra U.S. patent application Ser. No. 820,166, assigned to the assignee of this invention.

Aqueous solutions containing heavy metals may be purified, in accordance with this invention, by contacting the impure solution with particulated activated hydrotalcite or activated hydrotalcite/alumina adsorbent. Conveniently this may be carried out by passing the solution through a packed bed of particulated activated hydrotalcite or activated hydrotalcite/ alumina adsorbent. However, the description herein of the use of a packed bed should be considered to be only exemplary. The adsorbent may be in the form of a fluidized bed or in any other convenient form permitting contact between the adsorbent and the aqueous solution to be purified.

The flow rate of the solution through the packed bed should be adjusted to provide about 2 to 60 minutes, preferably about 20 minutes, of residence or contact time in the bed, i.e., the flow rate per hour should range from about 1 to 30 times the volume of the bed, preferably about 3 times the volume of the bed. Thus, if it is desired to increase the flow rate through the bed, the corresponding volume of the bed should be increased to maintain the residence time to insure adequate stripping of the heavy metals from the solution by the adsorbent.

This amount of contact time should be sufficient to remove from 80 to substantially 100% of the heavy metals typically present, for example, in wash water from plating baths, i.e., less than about 100-1000 ppm total metal ion concentration. When such a solution is processed in accordance with the invention, substantially all of the heavy metal ions in the solution are removed. The term "substantially all", as used herein, is intended to mean that the amount of metal ions left in the solution after passing through the adsorbent bed is less than about 5 ppm. Preferably the amount of metal ions left in the solution is less than about 1 ppm.

If a concentration higher than, for example, 1000 ppm is present in a particular solution, the contact time may be increased by enlarging the bed volume or, more simply, by decreasing the flow rate through the bed to extend the residence time. Alternatively, the solution may be passed through the adsorbent bed one or more additional times. However, if an adequate residence time has been provided, additional passes through the adsorbent should be unnecessary.

In this regard it should be noted that it would be preferred, particularly in a continuous flow system, to monitor the effluent from the adsorbent bed to insure that the desired adsorption is being carried out. Such monitoring means would also be helpful in ascertaining when the adsorption capacity of the bed has been reached as well as being useful in monitoring the regeneration of the bed as will be described. Such monitoring means may comprise a pH meter to determine or monitor the pH of the effluent since the pH of the effluent tends to drop with increasing amount of solution passed through the bed, as will be illustrated and discussed below.

Figure 2:
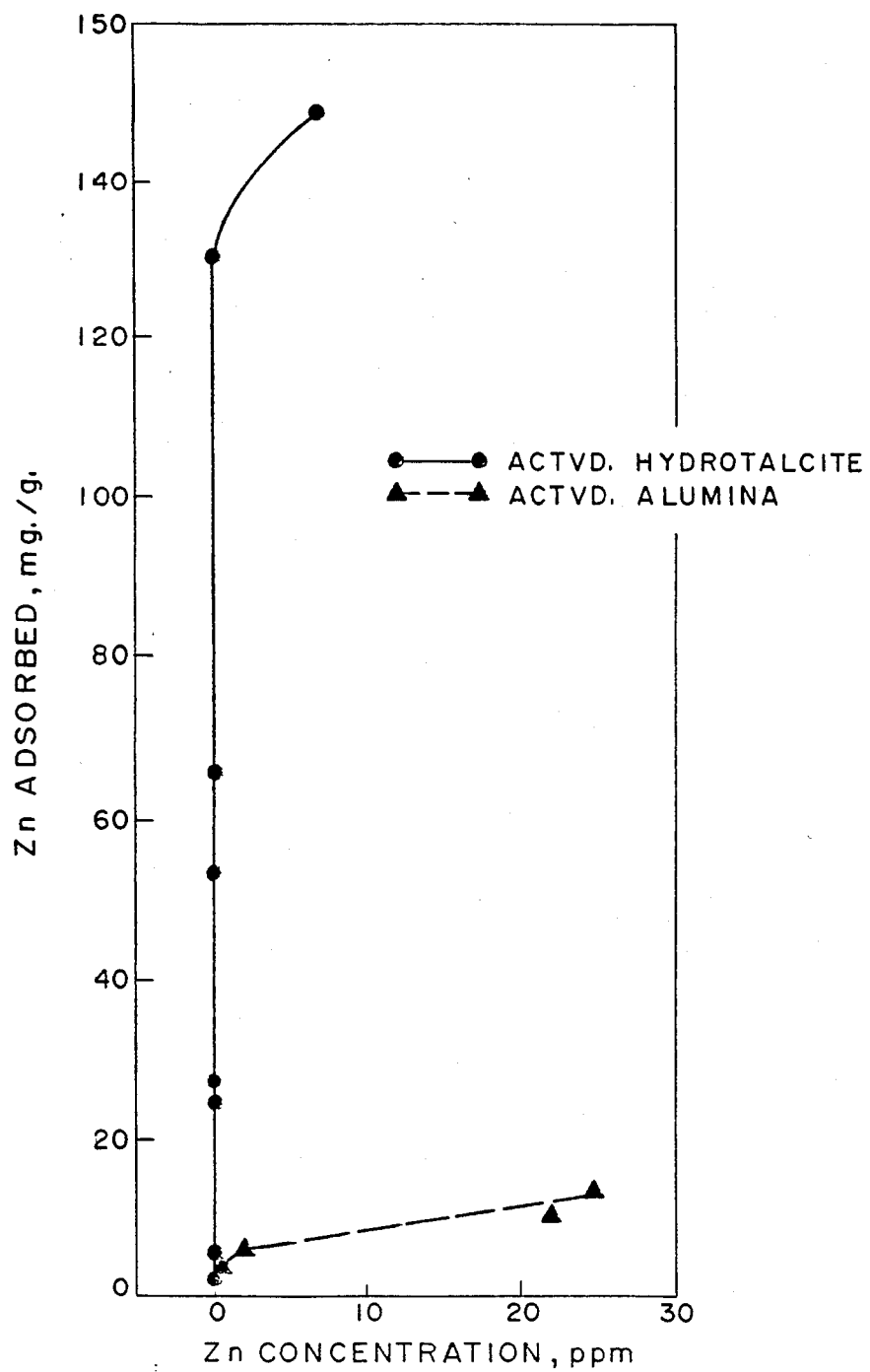
FIG. 2 is a isotherm graphing respectively the adsorption capacity of activated hydrotalcite and activated alumina as adsorbents for zinc ions, viz., $Zn^{2+}$.
Figure 3:
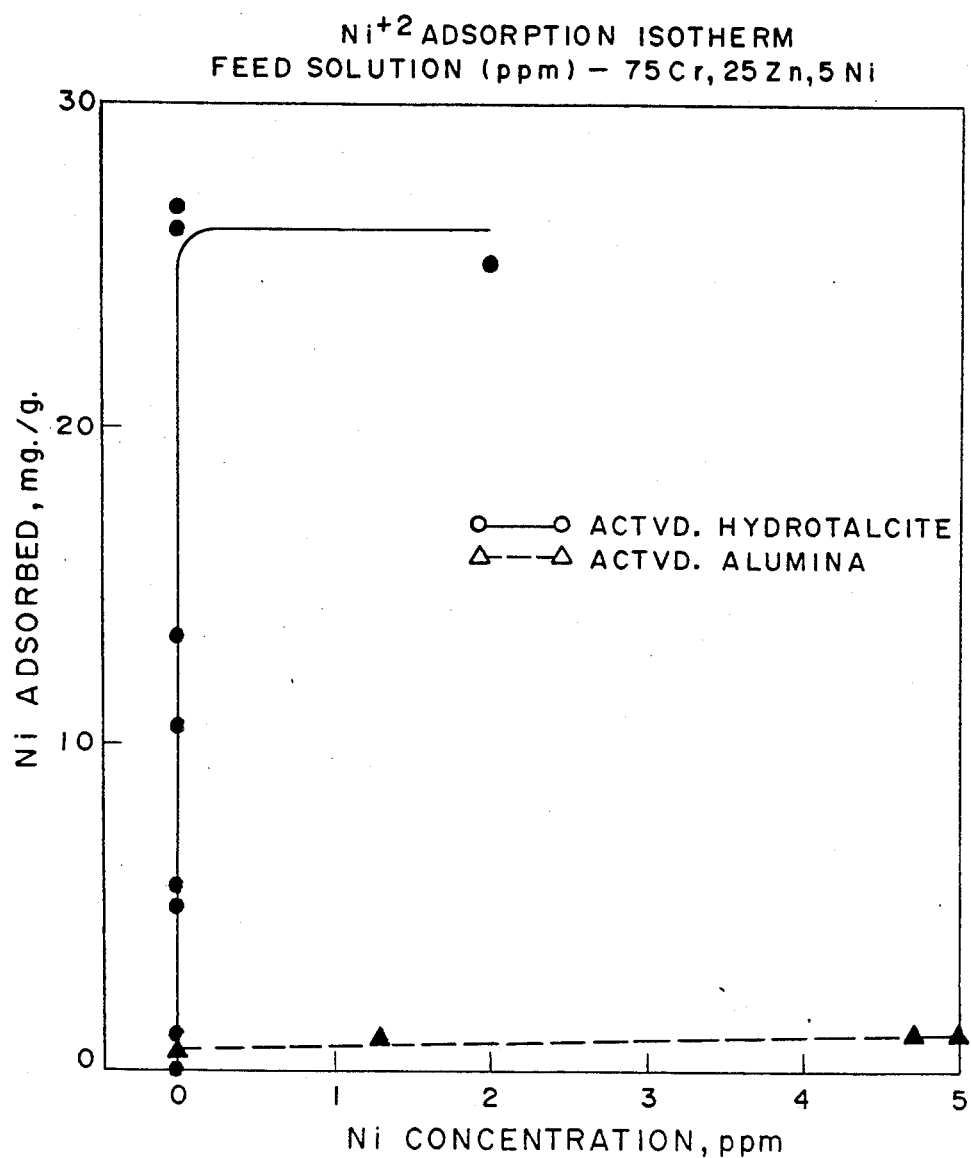
FIG. 3 is a isotherm graphing respectively the adsorption capacity of activated hydrotalcite and activated alumina as adsorbents for nickel ions, viz., $Ni^{2+}$.

Referring to FIGS. 1–3, experiments were run to determine the respective adsorption of chromium, zinc, and nickel ions by activated alumina (100 wt. %) and activated hydrotalcite (100 wt. %), respectively, from a solution containing 75 ppm chromium, 25 ppm zinc, and 5 ppm nickel as a multi-component mixture of anions ($CrO_4^{2-}$) and cations ($Zn^{2+}$ and $Ni^{2+}$). For each point on the isotherms, a given amount of either adsorbent was added as a powder of about −325 mesh (Tyler), stirred for 24 hours, and then removed by filtration. The concentration of the remaining solution was then determined as shown and the amount of the respective metal adsorbed was determined and plotted in milligrams of adsorbed metal per gram of adsorbent (mg/g).

The results, as also shown in Table I below, indicate that both adsorbents are capable of removing most of the metal impurities, but that the activated hydrotalcite has a higher adsorption per gram of adsorbent than the activated alumina indicating that a bed of a given amount of activated hydrotalcite would have a higher capacity for adsorbing such metals from a solution of given metal ion concentration before the need for regeneration of the adsorbent.

TABLE I

| | (Summary of Adsorption Capacity) | | |
|---|---|---|---|
| Metal Ion | Activated Hydrotalcite mg/g | Activated Alumina mg/g | Ratio |
| Cr(VI) | 59 | 27 | 2 |
| $Zn^{2+}$ | 150 | 13 | 12 |
| $Ni^{2+}$ | 25 | 1 | 25 |
| Total | 234 | 41 | 6 |

Figure 4:
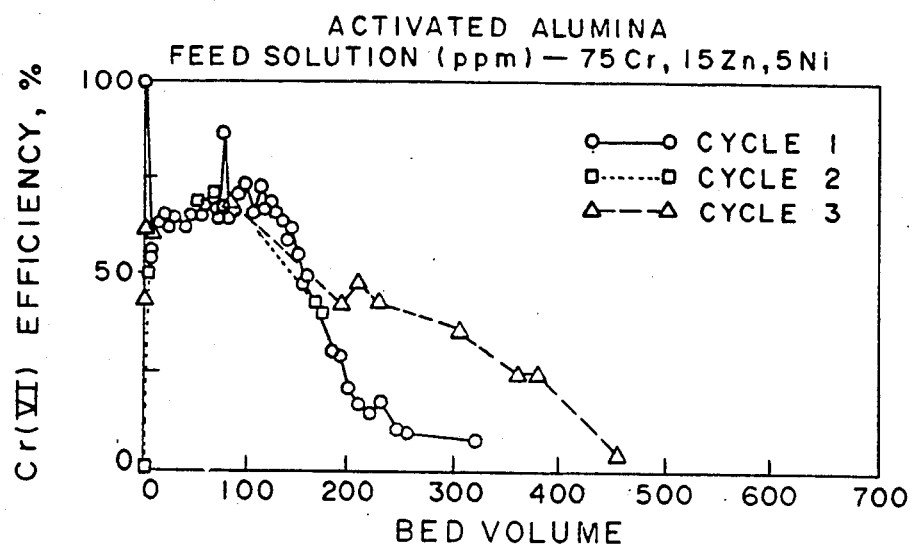
FIG. 4 is a graph plotting the efficiency of chromium removal from an activated alumina bed as a function of amount of heavy metal-containing solution passed through the bed.
Figure 5:
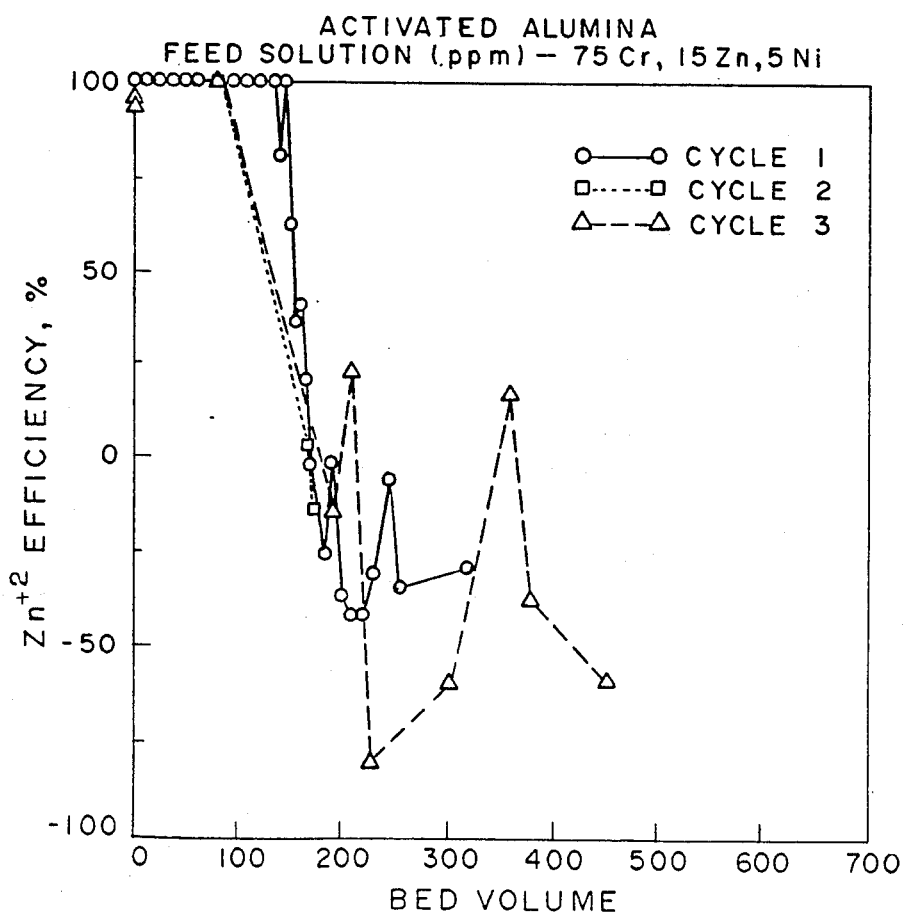
FIG. 5 is a graph plotting the efficiency of zinc removal from an activated alumina bed as a function of amount of heavy metal-containing solution passed through the bed.
Figure 6:
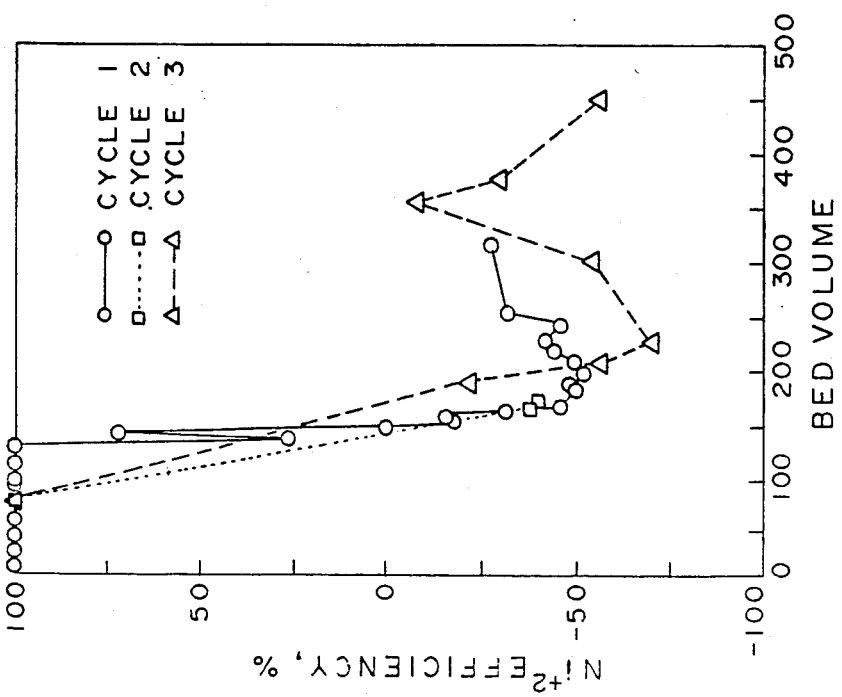
FIG. 6 is a graph plotting the efficiency of nickel removal from an activated alumina bed as a function of amount of heavy metal-containing solution passed through the bed.

To verify this, activated alumina, i.e., alumina heated to a dehydration temperature of approximately 450° C., was crushed to a particle size range of −14 to +28 mesh (Tyler) and packed in a one inch column to a height of 30 inches. An aqueous feed solution at room temperature (about 25° C.) containing 75 ppm chromium, 15 ppm zinc, and 5 ppm nickel was fed through the column at a rate of about 17 cc per minute to provide a residence time (expressed as empty bed contact time or EBCT) of about 20 minutes. FIGS. 4–6 plot the removal of the respective metal ions as a function of the amount of the solution passed through the column. It will be noted that, in each graph, there are three curves identified, respectively, as cycle 1, cycle 2, and cycle 3. Cycle 1 represents the results initially obtained while cycle 2 (and 3) represent results obtained after regeneration of the column as will be explained below.

From FIG. 4, it can be seen that the activated alumina bed was capable of giving less than 75% chromium removal efficiency. In other words, at least 25% of the chromium ions or greater than 19 ppm chromium appeared in the column effluent immediately. Right from the start, the chromium breakthrough in the column effluent was evident. The chromium removal efficiency dropped rapidly below 50% after 150 bed volumes.

From FIGS. 5 and 6, it can be seen that 100% removal efficiency for Zn and Ni was observed, at least for roughly 150 bed volumes, beyond which the removal efficiency dropped precipitously.

Figure 7:
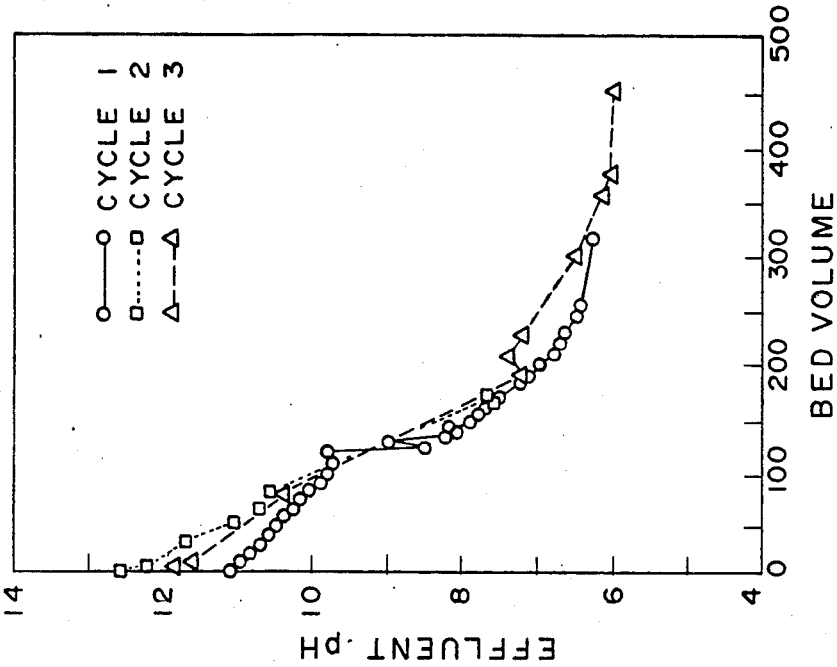
FIG. 7 is a graph plotting the pH of the effluent from an activated alumina bed as a function of amount of heavy metal-containing solution passed through the bed.

FIG. 7 is a plot showing the gradual drop in pH during each cycle as more of the metal-containing solution is passed through the bed. This drop in pH can be used as a means to monitor the effectiveness of the adsorbent and the need to regenerate the bed as will be discussed below.

The adsorption characteristics of an adsorbent containing 20 wt. % activated hydrotalcite (and 80 wt. % activated alumina) were then determined. An aqueous solution containing 75 ppm chromium, 25 ppm zinc, and 5 ppm nickel was passed through thirty inches of a packed one inch diameter column as previously described except that this adsorbent material comprised an extrudate consisting of 19 wt. % activated hydrotalcite, 78 wt. % activated alumina, and 3 wt. % of a carboxy methyl cellulose organic binder available from FMC Corporation under the trademark AVICEL. The activated hydrotalcite/alumina material was extruded in 1/16 inch diameter pellets, aged for 1 hour in steam at 110° C. and for 4 hours in water at 85° C. and then reactivated at 500° C. for 2 hours in air. During this activation, the organic binder was burnt off. The extrudate was then crushed and sized to −14 to +28 mesh (Tyler) before loading into the column.

Figure 8:
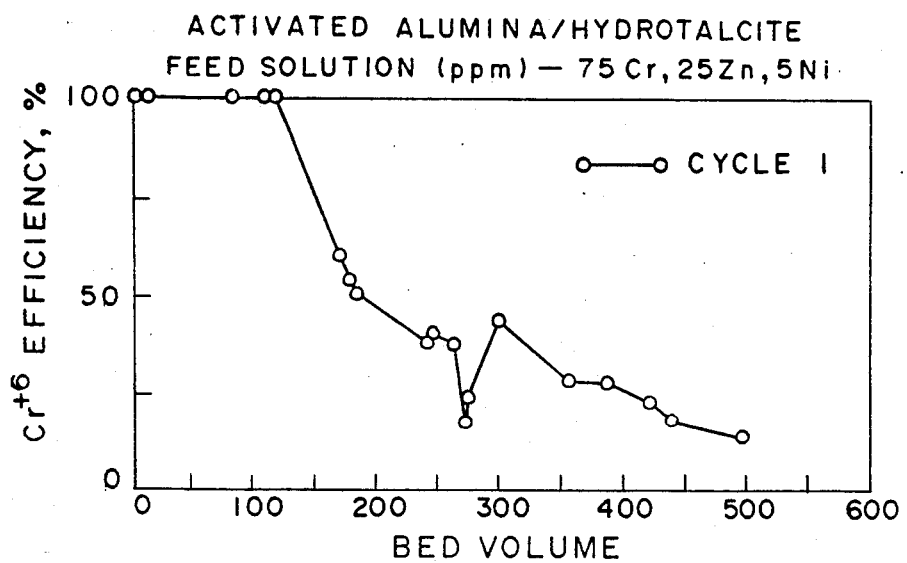
FIG. 8 is a graph plotting the efficiency of chromium removal from an activated alumina/hydrotalcite bed as a function of amount of heavy metal-containing solution passed through the bed.
Figure 9:
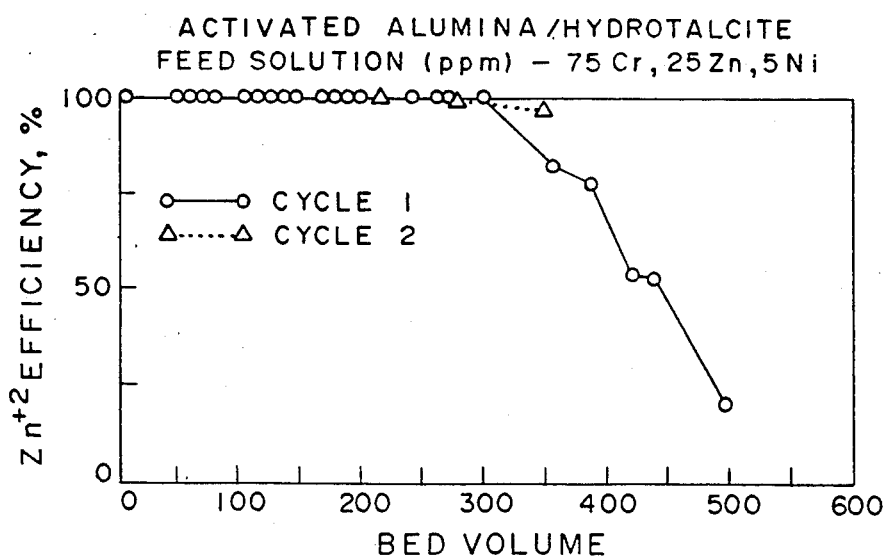
FIG. 9 is a graph plotting the efficiency of zinc removal from an activated alumina/hydrotalcite bed as a function of amount of heavy metal-containing solution passed through the bed.
Figure 10:
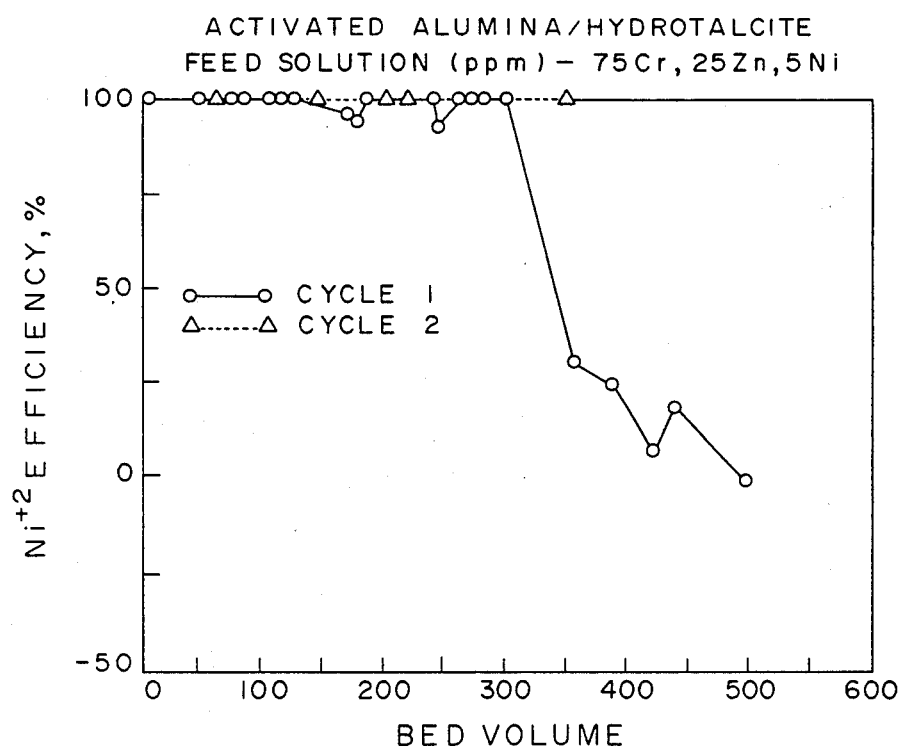
FIG. 10 is a graph plotting the efficiency of nickel removal from an activated alumina/hydrotalcite bed as a function of amount of heavy metal-containing solution passed through the bed.

The respective curves plotted in FIGS. 8–10 for chromium, zinc, and nickel adsorption, and the corresponding results tabulated in Table II, indicate excellent adsorption of all three metals with virtually all of the metals being substantially completely adsorbed over the first 125 bed volumes of solution passed through the column and both zinc and nickel substantially completely adsorbed over about the first 300 bed volumes of solution. It should be further noted that the metal ion-containing solution passed through the activated hydrotalcite/ alumina adsorbent actually had a higher zinc content than the solution passed through the activated alumina bed previously described with respect to FIGS. 4–6 (25 ppm instead of 15 ppm).

TABLE II

| | (Bed Volumes Before Breakthrough) | |
|---|---|---|
| Metal Ion | Activated Alumina | 20 wt. % Hydrotalcite 80 wt. % Alumina |
| Cr(VI) | 0 | 125 |
| $Zn^{2+}$ | 145 | 300 |
| $Ni^{2+}$ | 135 | 300 |

Figure 11:
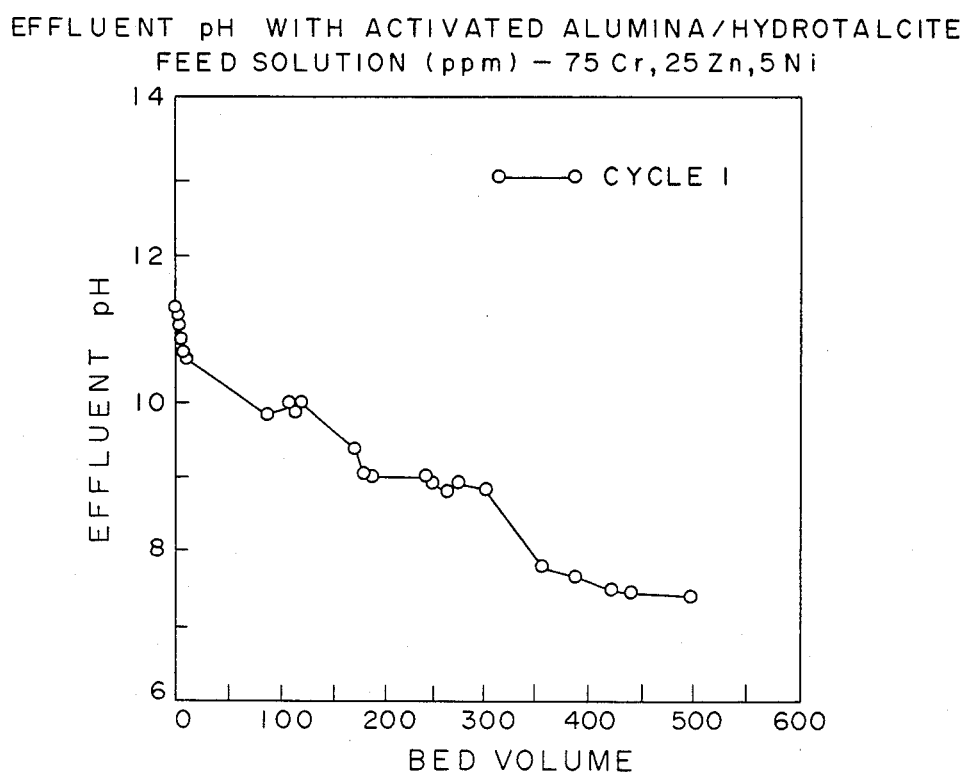
FIG. 11 is a graph plotting the pH of the effluent from an activated alumina/hydrotalcite bed as a function of amount of heavy metal-containing solution passed through the bed.
Figure 12:
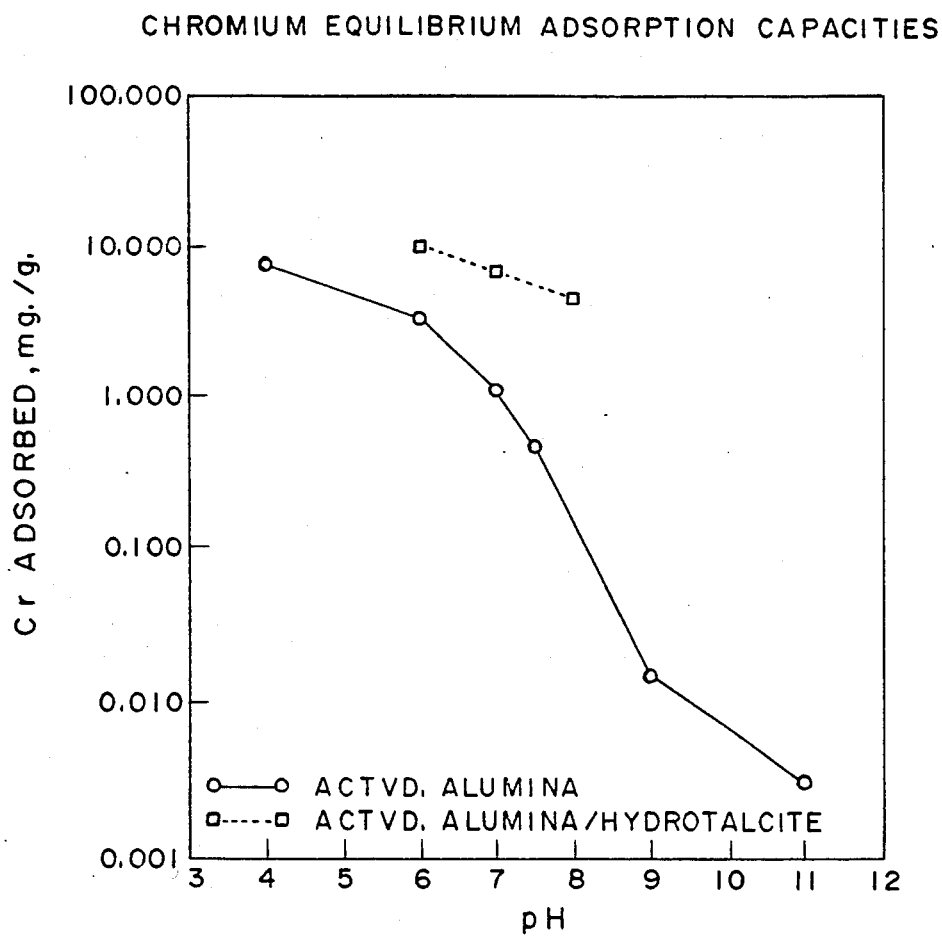
FIG. 12 is graph plotting amount of chromium adsorbed against pH at equilibrium for both activated alumina and an activated alumina/hydrotalcite mixture.

FIG. 11 indicates the gradual drop in pH of the effluent solution as more bed volumes pass through the column of activated hydrotalcite/alumina. FIG. 12 shows the relationship between this gradual drop in pH and the total amount of chromium which can be adsorbed by the activated hydrotalcite/alumina adsorbent at equilibrium indicating the remaining adsorption capacity of the bed.

The capacity of the bed to effectively adsorb heavy metal ions from an aqueous solution is eventually reached after which stripping or regeneration of the activated hydrotalcite bed or hydrotalcite/alumina bed becomes advantageous and eventually necessary in accordance with the invention. Since this capacity has been demonstrated to be related to the above noted drop in pH, a pH meter may be used to monitor the effluent to thereby signal when the flow should be stopped and the adsorbent bed regenerated in accordance with the invention.

Referring again to FIG. 11, it will be noted that there is a drop in pH at about 300 bed volumes. This, in turn, is consistent with the respective drops in adsorption for chromium, zinc, and nickel shown in FIGS. 8-10. This indicates that monitoring the pH of the effluent to determine when the pH drops to about 8 would provide a fairly accurate determination of when regeneration of the adsorbent bed should be commenced.

This regeneration may be accomplished by using a stripping flow or flush of an alkali metal hydroxide such as sodium hydroxide solution of about 1 wt. % or less concentration which may be passed through the bed either countercurrent to the normal flow or in the same direction to strip the adsorbed heavy metal ions from the activated hydrotalcite or activated hydrotalcite/alumina adsorbent. While less concentrated amounts of stripping or regeneration agent may be used down to, for example, about 0.01 wt. %, such usage will extend the amount of stripping liquid which must be passed through the bed to substantially remove all of the adsorbed metals which, in turn, extends the regeneration time. Greater concentrations of alkali metal hydroxide beyond about 1 wt. % may attack and degrade the adsorbent material and, therefore, should be avoided.

Figure 13:
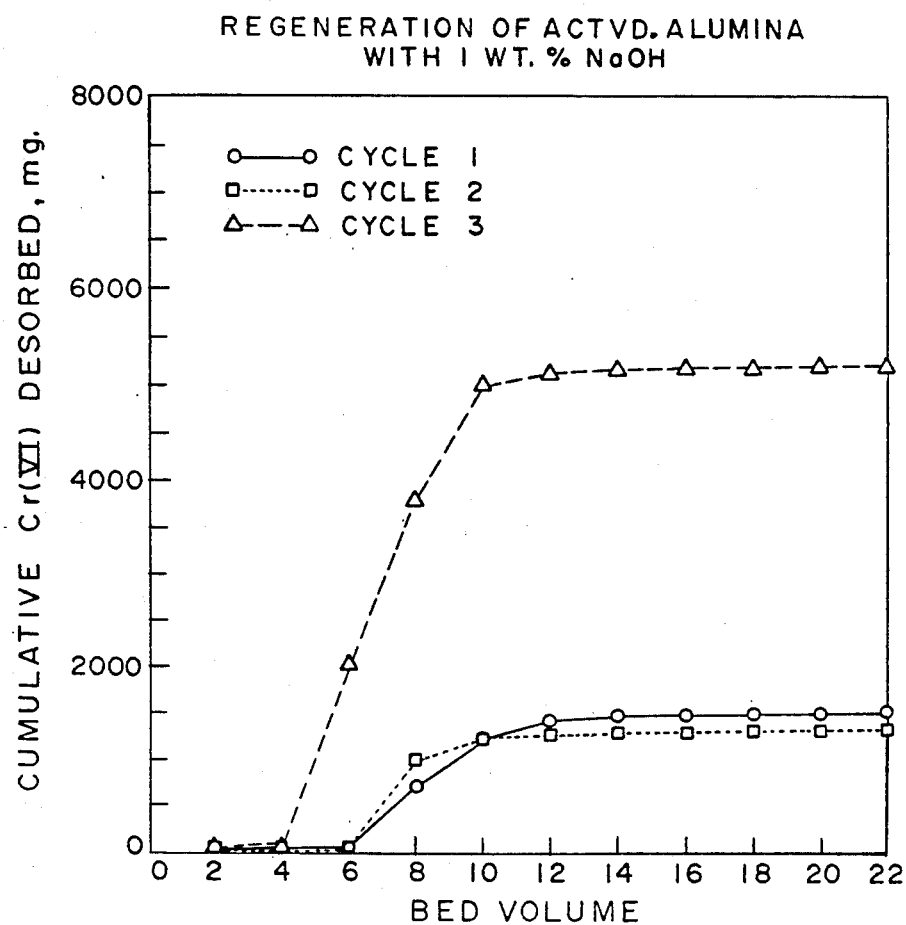
FIG. 13 is a graph plotting amount of chromium removed from an activated alumina bed as a function of 1 wt. % NaOH regeneration fluid passed through bed.

The amount of regeneration solution needed to effectively strip the bed will depend upon the volume of the bed and the amount of heavy metal ions adsorbed, as well as the concentration of the stripping liquid. As shown in FIG. 13, most of the metal impurities in an activated alumina bed may be removed by regeneration with about 6-8 bed volumes of a 1 wt. % sodium hydroxide solution. The three cycles shown in the Figure represent three subsequent regeneration cycles after three adsorption cycles. A 20 minute contact time was used for the regeneration of the activated alumina bed. Generally, the flow rate and contact or residence time of the stripping solution in the bed should approximate that of the adsorption cycle.

As referred to earlier, preferably the effluent flow of regenerating or stripping solution is monitored to determine the progress of removal of the adsorbed metal ions from the activated hydrotalcite-containing adsorbent. When a concentration of less then 1 ppm of metal ions is detected in the effluent regeneration liquid flowing from the adsorbent bed, it may be presumed that all of the metal ions removable with the particular regeneration material have been desorbed from the adsorbent bed.

Figure 14:
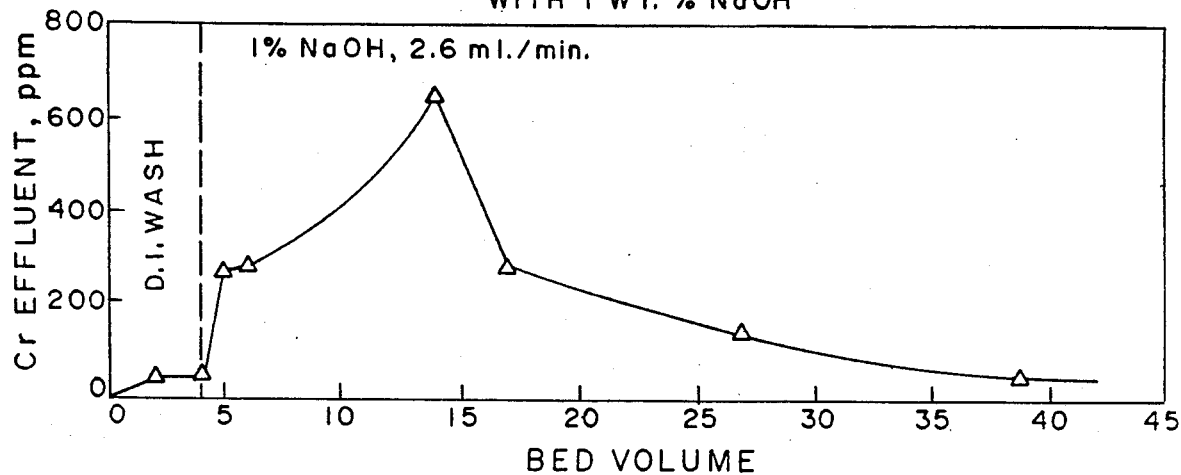
FIG. 14 is a graph plotting amount of chromium removed from an activated alumina/hydrotalcite bed as a function of 1 wt. % NaOH regeneration fluid passed through bed.

FIG. 14 illustrates the regeneration of a 20 wt. % activated hydrotalcite/80 wt. % activated alumina bed with a 1 wt. % sodium hydroxide solution passed through the column at a rate of about 2.6 ml/min. It will be noted that a peak in chromium concentration in the regeneration effluent occurs at about 13-15 bed volumes of regeneration solution with a drop down to about 16 bed volumes and a gradual taper thereafter.

Figure 15:
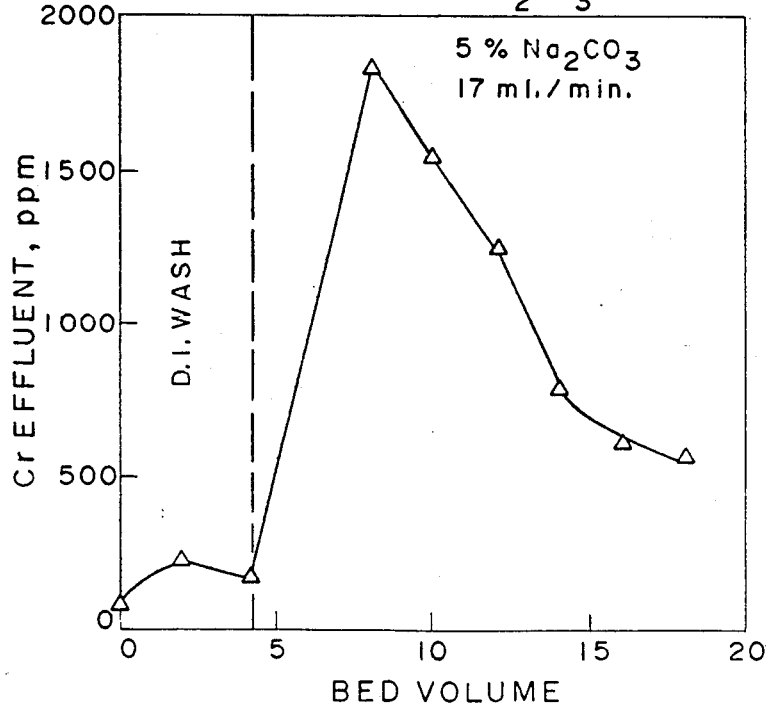
FIG. 15 is a graph plotting amount of chromium removed from an activated alumina/hydrotalcite bed as a function of 5 wt. % $Na_2CO_3$ regeneration fluid passed through bed.

Other stripping materials can be used such as, for example, about 5 wt. % sodium carbonate. However, when sodium carbonate is used, only the chromium is stripped from the material with very little zinc or nickel removed. It should be noted, however, that the chromium capacity of the materials used in the process of the invention is reached considerably sooner than the zinc or nickel capacity which provides at least limited utility for a stripping or regeneration agent which only removes chromium. Furthermore, it may be of interest to selectively remove only one metal, for example, the expensive chromium ions, for purposes of recovery and recycling of the particular metal. FIG. 15 shows the stripping of chromium from a similar bed using a 5 wt. % sodium carbonate stripping agent passed through the column at a rate of 17 ml/min. As referred to above, the metal ions stripped from the adsorption column may be recovered and/or recycled back to the industrial process, e.g., an electroplating process, from where the impure solution originated.

Thus, the invention provides a process for purifying an impure aqueous solution containing heavy metal ions which comprises passing the impure solution through a filter bed containing either pure activated hydrotalcite or a mixture of activated hydrotalcite and activated alumina to cause the heavy metal ions in the solution to be adsorbed out of the solution onto the activated adsorbent. When the capacity of the adsorbent to adsorb metal ions is reached, the activated adsorbent material may be regenerated and the metal ions recovered and recycled back for reuse in the process of origin of the impure solution or else suitably disposed of.

The invention thus provides a cyclic process with adsorption and desorption with high capacities for metal adsorption on the activated adsorption material and capability to regenerate to regain substantially all of the adsorption capacity. The metals may be recovered as metals or metal salts for either recycling or disposal with the reduction in stream volume resulting from the concentration resulting in less material which must be hauled away if recycling is not desired or feasible. Furthermore, the need to use chemical agents for reduction of hexavalent chromium to trivalent chromium is eliminated and the production and disposal of hazardous sludges is avoided by the process.

Having thus described the invention, what is claimed is:

1. A process for purifying an aqueous solution containing one or more heavy metals selected from the class consisting of antimony, arsenic, beryllium, cadmium, chromium, copper, lead, mercury, nickel, selenium, silver, thallium, tin, and zinc by adsorbing the heavy metals from the solution and recovering the metal which comprises:
 (a) passing the solution through an activated adsorbent comprising at least 20 wt. % activated hydrotalcite formed by:
  (i) reacting an activated magnesia with an aqueous solution containing ions of aluminate, carbonate, and hydroxyl; and
  (ii) subsequently heating the hydrotalcite to about 500° C. to activate it;
 to cause the heavy metals in said solution to be adsorbed by said activated hydrotalcite-containing adsorbent;
 (b) stripping said heavy metals from said activated hydrotalcite-containing adsorbent to regenerate said adsorbent by passing through said adsorbent a solution containing from about 0.01 to 1 wt. % of an alkali metal hydroxide; and (c) recovering said metal stripped from said activated hydrotalcite-containing adsorbent.

2. The process of claim 1 wherein said step of passing said solution through an activated adsorbent to remove heavy metals is further characterized by the simultaneous, substantially complete removal of anions containing heavy metals including $CrO_4^{2-}$ and cations including $Zn^{2+}$ and $Ni^{2+}$ from said solution.

3. The process of claim 2 wherein said step of stripping said adsorbed heavy metal ions from said activated hydrotalcite-containing adsorbent to regenerate said adsorbent further includes monitoring the effluent from said adsorbent to determine when regeneration of said adsorbent is needed.

4. The process of claim 3 wherein said step of monitoring said effluent from said adsorbent further comprises monitoring the pH of said effluent.

5. The process of claim 4 wherein said steps of monitoring the pH of said effluent and regenerating said adsorbent further comprises commencing said stripping step when the pH of said effluent reaches a predetermined level indicative of the capacity of the adsorbent.

6. The process of claim 1 wherein said activated hydrotalcite-containing adsorbent comprises from 20 to 100 wt. % activated hydrotalcite and from 0 to 80 wt. % activated alumina.

7. An improved process for the purification of an impure aqueous solution containing heavy metal ions which comprises:

(a) forming an adsorbent bed containing at least 20 to 100 wt. % activated by hydrotalcite with the balance consisting essentially of activated alumina, said activated hydrotalcite being formed by:
 (1) reacting activated magnesia with an aqueous solution containing ions of aluminate, carbonate, and hydroxyl; and
 (2) subsequently heating the hydrotalcite to about 500° C. to activate it;

(b) passing said impure solution through said adsorbent bed to cause said heavy metal ions to be removed from said impure aqueous solution by adsorption onto said adsorbent; and (c) periodically removing said adsorbed heavy metal ions from said activated hydrotalcite-containing adsorbent to regenerate said adsorbent.

8. The process of claim 7 wherein the particle size of said adsorbent ranges from −325 mesh (Tyler) to about ¼ inch in diameter.

9. The process of claim 8 wherein said step of passing said impure aqueous liquid through said activated hydrotalcite-containing adsorbent comprises passing said liquid through said adsorbent at a rate sufficient to permit removal of substantially all of the heavy metal ions from said impure liquid.

10. The process of claim 9 wherein said step of passing said impure aqueous liquid through said activated hydrotalcite-containing adsorbent further comprises passing said liquid through said adsorbent at a rate sufficient to provide a contact time of about 2 to 60 minutes in said adsorbent bed.

11. The process of claim 10 wherein said step of passing said impure aqueous liquid through said activated hydrotalcite-containing adsorbent further comprises passing said liquid through said adsorbent at a rate sufficient to provide a contact time of about 20 minutes in said adsorbent bed.

12. The process of claim 8 wherein said impure solution is passed through said activated hydrotalcite-containing adsorbent until said solution has a heavy metal ion concentration of less than 5 ppm of heavy metal ions.

13. The process of claim 8 wherein said impure solution is passed through said activated hydrotalcite-containing adsorbent until said solution has a heavy metal ion concentration of less than 1 ppm of heavy metal ions.

14. The process of claim 7 wherein said step of periodically removing said adsorbed heavy metal ions to regenerate said activated hydrotalcite-containing adsorbent further comprises passing a stripping solution through said adsorbent.

15. The process of claim 14 wherein said step of periodically removing said adsorbed heavy metal ions from said activated hydrotalcite-containing adsorbent to regenerate said adsorbent further includes monitoring the effluent from said adsorbent to determine when regeneration of said adsorbent is needed.

16. The process of claim 15 wherein said step of monitoring said effluent from said adsorbent further comprises monitoring the pH of said effluent.

17. The process of claim 16 wherein said steps of monitoring the pH of said effluent and regenerating said adsorbent further comprises commencing said step of regeneration when the pH of said effluent reaches a predetermined level indicative of the capacity of the adsorbent.

18. The process of claim 17 wherein said step of regeneration is commenced when said pH level drops to 8.

19. The process of claim 14 wherein said step of removing said heavy metals from said activated hydrotalcite-containing adsorbent comprises passing a stripping solution selected from the class consisting of alkali metal hydroxides and alkali metal carbonates through said adsorbent material to recover said adsorbed heavy metals as a concentrated stream and to regenerate said activated hydrotalcite-containing adsorbent.

20. The process of claim 19 wherein said step of removing said heavy metals from said activated hydrotalcite-containing adsorbent comprises passing a solution of not greater than 1 wt. % sodium hydroxide through said activated hydrotalcite-containing adsorbent.

21. The process of claim 14 wherein said step of removing said adsorbed heavy metal ions from said activated hydrotalcite-containing adsorbent includes the further step of monitoring said stripping solution to determine when substantially all of said heavy metal ions have been removed from said activated hydrotalcite-containing adsorbent.

22. An improved process for the purification of an impure aqueous solution containing heavy metal ions which comprises:

(a) passing the solution through an adsorbent bed containing at least 20 wt. % activated hydrotalcite formed by first reacting activated magnesia with an aqueous solution containing ions of aluminate, carbonate, and hydroxyl and subsequently heating the hydrotalcite to activate it, with the balance of said adsorbent bed, if any, consisting essentially of activated alumina, to cause said heavy metal ions to be removed from the impure aqueous solution by adsorption onto the adsorbent; and (b) periodically removing said adsorbed heavy metal ions from said activated hydrotalcite-containing adsorbent to regenerate said adsorbent.

* * * * *